US012623792B2

(12) United States Patent

Hernandez Meza et al.

(10) Patent No.: US 12,623,792 B2

(45) Date of Patent: May 12, 2026

(54) SYSTEM AND METHOD FOR TRACKING AIRCRAFT FUEL USAGE AND EMISSIONS

(71) Applicant: GENERAL ELECTRIC COMPANY, Schenectady, NY (US)

(72) Inventors: Carlos Hernandez Meza, Queretaro (MX); Joseph Zelina, Waynesville, OH (US); Sharon M. Crall, Loveland, OH (US); Jose Manuel Rodriguez Miranda, Queretaro (MX)

(73) Assignee: General Electric Company, Evendale, OH (US)

( * ) Notice: Subject to any disclaimer, the term of this patent is extended or adjusted under 35 U.S.C. 154(b) by 157 days.

(21) Appl. No.: 18/429,982

(22) Filed: Feb. 1, 2024

(65) Prior Publication Data

US 2025/0250024 A1 Aug. 7, 2025

(51) Int. Cl.
B64D 45/00 (2006.01)
B64D 31/06 (2006.01)

(52) U.S. Cl.
CPC .............. B64D 45/00 (2013.01); B64D 31/06 (2013.01)

(58) Field of Classification Search
CPC ............. F05D 2260/80; F05D 2260/81; F05D 2260/821; F05D 2270/08; F02C 9/00; F02C 9/28; F02C 9/44; B64D 31/06; B64D 45/00
See application file for complete search history.

(56) References Cited

U.S. PATENT DOCUMENTS

| | | | | |
|---|---|---|---|---|
| 7,640,067 | B2 | 12/2009 | Boyden et al. | |
| 7,860,586 | B2 | 12/2010 | Boyden et al. | |
| 8,311,686 | B2 * | 11/2012 | Herkes | G08G 5/20 |
| | | | | 701/14 |
| 9,014,945 | B2 * | 4/2015 | Abrol | G05B 23/0294 |
| | | | | 60/773 |
| 9,057,301 | B2 | 6/2015 | Devarakonda | |
| 9,617,010 | B2 | 4/2017 | Conrad | |
| 10,112,727 | B1 | 10/2018 | Cutler | |
| 10,358,983 | B2 * | 7/2019 | Block | G05B 19/4065 |
| 10,416,235 | B2 * | 9/2019 | Kealy | H02K 11/35 |
| 10,676,048 | B2 | 6/2020 | Dixit et al. | |
| 11,203,445 | B2 | 12/2021 | Kimberly et al. | |
| 11,244,520 | B2 * | 2/2022 | Carbonne | H04W 4/38 |
| 12,060,170 | B2 * | 8/2024 | Smith, Jr. | B64D 45/00 |
| 12,151,827 | B2 | 11/2024 | Cutler | |

(Continued)

FOREIGN PATENT DOCUMENTS

| | | |
|---|---|---|
| CN | 111143972 A | 5/2020 |
| CN | 111911270 A | 11/2020 |

(Continued)

*Primary Examiner* — Carl C Staubach

(74) *Attorney, Agent, or Firm* — Hanley, Flight & Zimmerman, LLC

(57) ABSTRACT

A system and method of determining emissions for an aircraft with a turbine engine for a flight mission includes receiving a control data input. The control data input can receive a quality check, and then be projected to different power levels for completion of the flight mission. The projection to different power levels can receive another quality check. The system and method generate an emissions index based on the control data input projected to different power levels representing emissions for completion of the flight mission.

20 Claims, 5 Drawing Sheets

(56)  References Cited

U.S. PATENT DOCUMENTS

2009/0265049 A1* 10/2009 Wise ......................... G08G 5/30
                                                                701/3
2012/0072194 A1*  3/2012 Arnold ..................... F02C 9/00
                                                                703/7
2013/0158832 A1   6/2013 Moeckly et al.
2017/0259942 A1*  9/2017 Ziarno ................... G07C 5/008
2018/0025557 A1*  1/2018 Steinert ............. G05B 23/0221
                                                                701/99
2019/0333295 A1* 10/2019 Doriski ................. B64D 27/10
2019/0383221 A1* 12/2019 Du ......................... G05B 17/02
2024/0210963 A1   6/2024 Stollmeyer et al.
2025/0051031 A1   2/2025 Cutler
2025/0083824 A1   3/2025 Miftakhov et al.
2025/0122811 A1*  4/2025 Consiglio ............. F01D 21/003

FOREIGN PATENT DOCUMENTS

CN          119106621  A    12/2024
EP            3270241  A1    1/2018
JP          H04318299  A    11/1992
JP            4318299  B2    8/2009

* cited by examiner

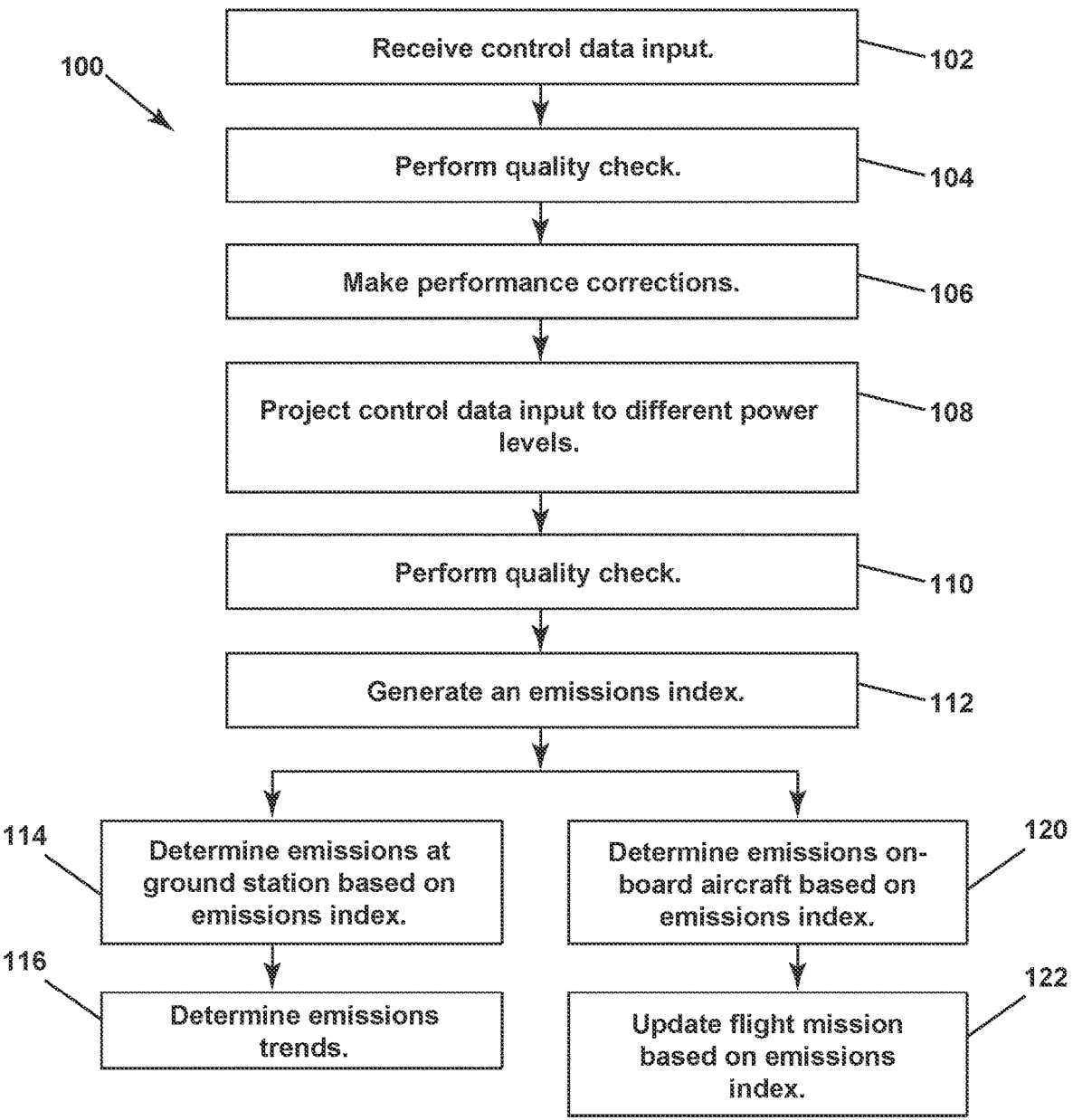

100

Receive control data input. — 102

Perform quality check. — 104

Make performance corrections. — 106

Project control data input to different power levels. — 108

Perform quality check. — 110

Generate an emissions index. — 112

114 — Determine emissions at ground station based on emissions index.

116 — Determine emissions trends.

120 — Determine emissions on-board aircraft based on emissions index.

122 — Update flight mission based on emissions index.

FIG. 5

SYSTEM AND METHOD FOR TRACKING AIRCRAFT FUEL USAGE AND EMISSIONS

TECHNICAL FIELD

The present subject matter relates generally to a system and method for determining aircraft emissions and estimating aircraft emissions for an aircraft, engine, or fleet in order to complete one or more flight missions.

BACKGROUND

A turbine engine used to drive an aircraft typically includes an engine core with a compressor section, a combustor section, and a turbine section in serial flow arrangement. In a bypass turbine engine, a fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator. Combustion of the fuel can produce emissions.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5 is a flow chart illustrating a method of determining emissions for an aircraft having a turbine engine for completing a flight mission, in accordance with aspects of the present disclosure.

DETAILED DESCRIPTION

Figure 1:
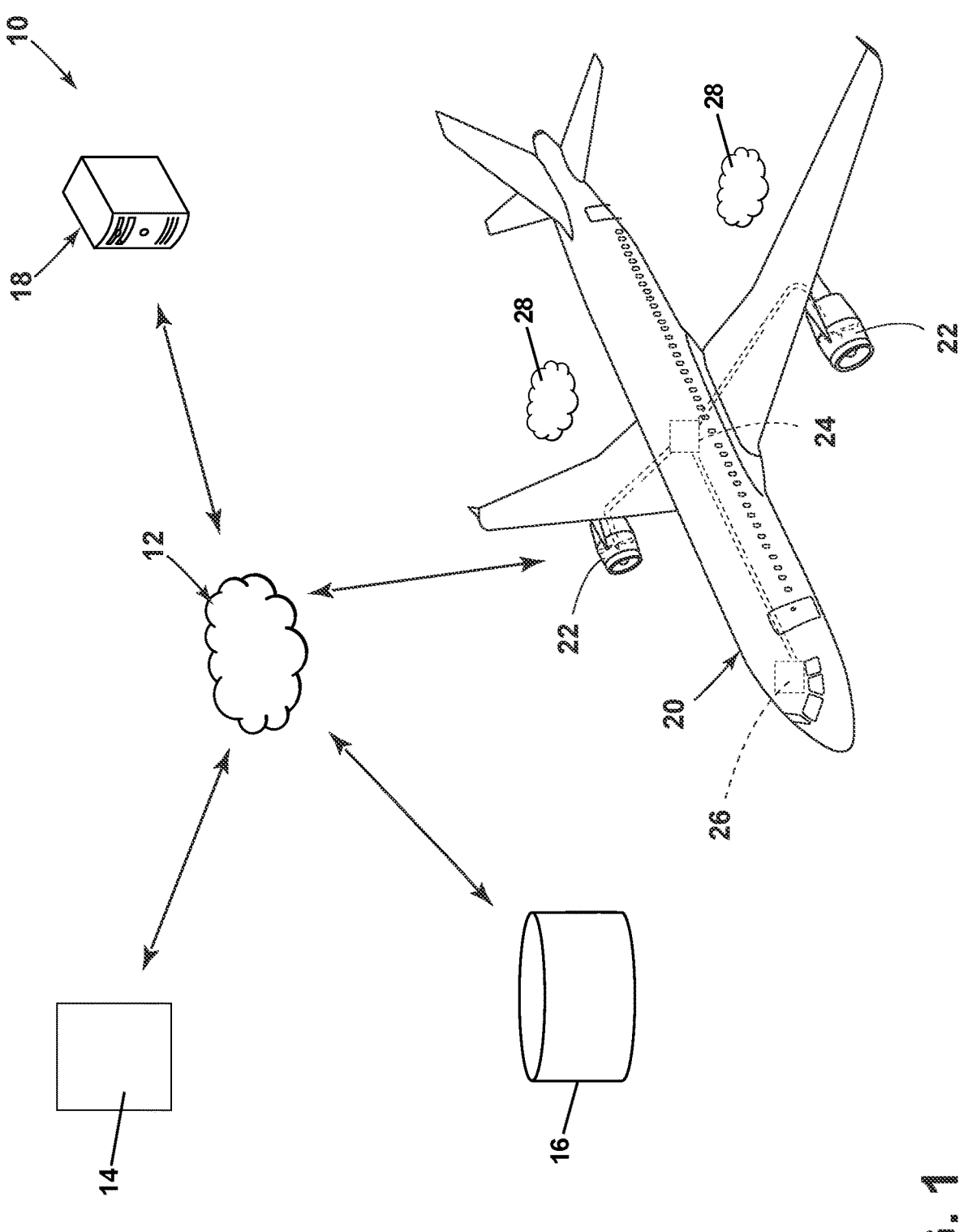
FIG. 1 is a schematic view of a system in communication with a network and an aircraft, in accordance with aspects of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure. While the aspects described herein relate to an aircraft and aircraft turbine engine implementation, it should be appreciated that the aspects can be applied to non-aircraft environments, such as ground-based, marine, or terrestrial systems, engines, or fuels in non-limiting examples. For example, while this description is directed toward a system architecture in an aircraft, aspects of the disclosure can be further applicable to non-aircraft implementations, such as terrestrial, aquatic, or other fueldriven systems. It will be understood that the illustrated aspects of the disclosure are only one non-limiting example of an aircraft, and many other possible aspects and configurations in addition to that shown are contemplated by the present disclosure. Similarly, while the discussion is generally toward a single aircraft, it should be appreciated that the aspects can apply across a fleet of multiple aircraft, and need not be specific to a single-aircraft implementation.

Aspects of the disclosure generally relate to a system and method for estimating emissions based on an engine cycle model and service data. The method produces an emission estimate as an emission index for individual flights, multiple flights, or a fleet of one or more aircraft, and can calculate emissions including but not limited to nitrogen oxides (NOx), carbon monoxides (CO), unburned hydrocarbons (UHC), non-volatile particle emissions (nvPM), and carbon dioxides ($CO_2$). The system and method can utilize data input during engine takeoff in order to tailor the emissions estimate to the engine's deterioration level, as well as other flight mission or aircraft data. As the engine ages and increases time-on-wing while in service, the engine naturally deteriorates, which impacts emissions, such as increasing emissions over time. With this data, the system and method can make an estimate of the total fuel expected to be consumed during flight, and provide an estimate of the total emissions as an emission index. This system and method can be incorporated onboard the aircraft, within on-ground systems in communication with the aircraft, both, or via communication among the two.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

A "set" or a set of elements as used herein can include any number of said elements, including one. The singular forms "a", "an", and "the" include plural references unless the context clearly dictates otherwise.

Additionally, as used herein, a "controller" can include a component configured or adapted to provide instruction, control, operation, or any form of communication for operable components to affect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing tasks or implement abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a controller can compare a first value with a second value, and operate or control operations of additional components based on the satisfying of that comparison. For example, when a sensed, measured, or provided value is compared with another value, including a stored or predetermined value, the satisfaction of that comparison can result in actions, functions, or operations controllable by the controller. It will be understood that such a determination may easily be altered to be satisfied by a positive/negative comparison or a true/false comparison. Example comparisons can include comparing a sensed or measured value to a threshold value or threshold value range.

The standard practice for determining emissions has been to determine fuel usage relative to standard emissions values per volume or mass of such fuel being used. Determination of emissions, such as those used for certification, are determined based on measurements made on a test engine typically in pristine condition. These measurements fail to account for a change in emissions through lifetime of the engine or aircraft, and are based solely on mass or volume of fuel used relative to the test engine baseline. Furthermore, these measurements fail to account for differences in changes to emissions among power levels through lifetime of the engine or aircraft.

An anticipated fuel usage can be determined based upon a flight mission, which includes a flight distance and flight path. Emissions can be estimated based upon the standard emissions per volume or mass, as determined by expected fuel usage to complete the flight mission, such as fuel usage mass or volume multiplied by time or by distance. However, this fails to account for deterioration of the engines, and cannot account for changes in emissions over time specific to the engine. Furthermore, standard practice fails to account for different levels of emissions emitted during different power levels of engine operation, or as the engine deterioration impacts emissions at different power levels, where the different power levels can result in different values for the mass or volume of emissions emitted per unit of fuel than other engine power levels. Therefore, a more intuitive solution is needed, with a greater ability to account for emissions specific to the engine, aircraft, fleet of aircraft, or flight mission, and an ability to present this information to pilots, operators, ground communications, airlines, consumers, or retailers, particularly in real-time.

The practice that resulted in the subject of the present disclosure has proceeded in the manner of designing a system and method that is suitable for use with existing systems and infrastructure, while improving accuracy of determined emissions and related cost for the use of a fuel for an aircraft, engine, fuel, or flight mission. The disclosure herein includes a system to determine, evaluate, or output an emission index tailored to the aircraft and flight mission. The emission index may be presented to the aircraft operator, airline, business, air traffic control, or other entities where the emissions estimate can be utilized. Such an emission index can be utilized to determine and manage emissions during flight, as well as balancing emissions against contrails. Additionally, the disclosure can be used to identify issues with an engine, such as unintended or unexpected operation or lack thereof, via the emission index.

FIG. 1 schematically shows a system 10 that includes an aircraft 20, a ground station 14, a fuel storage 16, and a database 18 which are interconnected or otherwise communicable with one another via a network 12. The aircraft 20 can include one or more engines 22, such as turbine engines. The aircraft 20 can further include an avionics system 24, such as a FADEC, for operating and electronically communicating among systems and elements of the aircraft 20, including the engines 22 and a display 26. The avionics system 24 can be communicatively and/or operatively coupled to the engines 22 to make measurements of the engine 22, such as fuel consumption, power level, cycle speed, or temperature in non-limiting examples. The avionics system 24 can be used to measure or record flight information, such as the engine speed, engine power level, fuel consumption, or engine cycle in non-limiting examples, as well as flight-specific information, such as flight path, flight distance, weather, flight speed, or other environmental factors in additional non-limiting examples. During operation, the burning of fuels to drive the engine 22 produces an emission 28. Non-limiting examples of emissions 28 can include nitrogen oxides (NOx), carbon monoxides (CO), unburned hydrocarbons (UHC), non-volatile particle emissions (NVPM), and carbon dioxides ($CO_2$).

The database 18 can be communicatively coupled to the aircraft 20 and the avionics system 24 via the network 12. The network 12 can communicate data or information among the system 10 in real-time or upon request. The data or information can be shared and communicated among multiple aircraft 20, such as among a fleet of aircraft 20, as well as with the ground station 14 or air-traffic control managing such a fleet. While the database 18 is illustrated as physical structure, it should be appreciated that the database 18 can be contained on any portion of the network 12, such as stored on the avionics system 24 of the aircraft 20 or on the ground station 14 in non-limiting examples. The ground station 14 can include an airport, control towers, or air traffic control in non-limiting examples. Additionally, or alternatively, the ground station 14 can include fuel stations, aircraft hangers for storage, maintenance or inspection, or a central hub in non-limiting examples. The network 12, database 18, and ground station 14 can send or receive real-time information to or from the aircraft 20 in order to make real-time fuel usage and emissions determinations during flight.

The ground station 14, the fuel storage 16, the aircraft 20, and the database 18, as well as any other aspect connected to the network 12 can include a controller, a memory, and a processor, which can be utilized to receive, send, interpret, or otherwise use information or measurements made of the system 10. In a non-limiting example, the database 18 can be stored on a memory contained on another aspect connected to the network 12, such as at the ground station 14 or on the aircraft 20.

Figure 2:
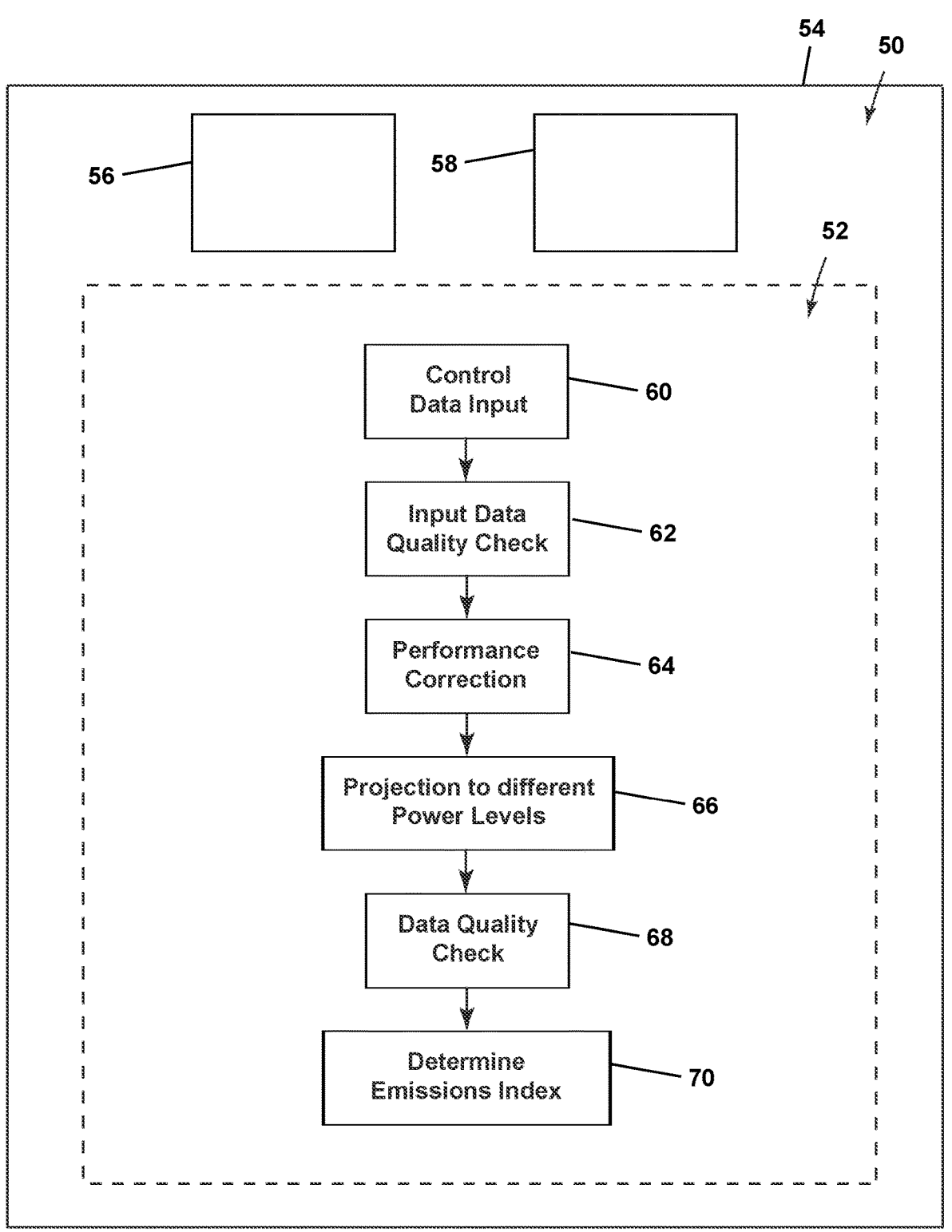
FIG. 2 is a schematic view of a system for determining an emission index for the aircraft of FIG. 1, in accordance with aspects of the present disclosure.

Referring to FIG. 2, a system 50, which can include an emission monitoring and estimation system, is provided as a tool 52 to evaluate or determine emissions or fuel usage in order to output an emission index, as well as operate a turbine engine 22 or complete a flight mission based upon the output emission index. The system 50 can be integrated or incorporated into any aspect of the network 12 (FIG. 1), such as into the aircraft 20 or the ground station 14. The emission index can be representative of a mass or volume of emissions for a flight mission, or an emission (mass or volume) per unit of fuel used during engine operation for a flight mission. For example, particulate pollutants can be measured in weight, while gaseous form pollutants can be measured by terms of weight or volume. In another example, the emission index can be expressed in grams of pollutant per unit distance traveled by the aircraft 20. In yet another example, the emission index can be represented as a carbon cost, measuring the amount of carbon emitted due to the use of the fuel by the engine 22 or aircraft 20, and the emission index can represent a carbon footprint, represented as mass of carbon dioxide emitted per unit time, unit fuel, or unit distance. In yet another example, the emission index can determine a carbon intensity. It should be appreciated that the emission index or carbon intensity need not be limited to carbon only, and can be a measure of any or different types of emissions, including but not limited to carbon, carbon monoxide, carbon dioxide, methane, nitrous oxides, hydro-fluorocarbons, perfluorocarbons, fluorinated emissions, or other greenhouse gases in non-limiting examples. Additionally, the emission index can be represented as a combination of two or more emissions, types, intensities, footprints, or other measurements or types of emissions.

In this way, it should be understood that the system 50 can provide for determining the emission index for the aircraft 20 (FIG. 1), the engine 22 (FIG. 1), a fuel, fuel mix, or fuel type, or a flight mission. A flight mission can include details or instructions for completing a flight from a departure airport to an arrival airport, as well as considering pre-flight and post-flight requirements to complete the flight mission. Additional details for a flight mission can include aircraft type, engine type, weather, travel path, altitude, departing airport, arrival airport, engine power level and time expected for engine operation at each power level, aircraft weight, and engine temperature in non-limiting examples. Therefore, the emission index can describe either or both of the monetary or pollutant value of purchasing and/or using a fuel within the aircraft 20 (FIG. 1), the engine 22 (FIG. 1), or fleet thereof. In one example, where the emission index represents multiple aircraft 20 or a fleet of aircraft 20, the emission index can be representative of a summation of the individual emission indexes totaled, in order to represent emissions from the entire fleet of aircraft 20. The emission index can be utilized by the system 50 to determine the emissions value or emissions cost of using a fuel, while considering the specifics of each aircraft 20 or engine 22, and can be done in real-time.

The system 50 can be controllably implemented or enabled by way of a controller 54 having a processor 56 and memory 58. The functionalities described herein can be implemented or enabled, at least partially, by the controller 54. In one non-limiting example, the controller 54 can include, or can be incorporated into the system 50, as described herein. For example, the controller 54 can be the incorporated as part of the avionics system 24 on the aircraft 20 (FIG. 1) or can be incorporated into the system 50 incorporated into the ground station 14 (FIG. 1). In one example, the controller 54 can include a non-transitory media, storing programming instructions in order to operate the system 50. In a non-limiting example, operation of an aircraft, an avionics system, or a turbine engine can be accomplished with the non-transitory media, in order to determine the emission index.

The system 50 provides for making measurements or decisions to determine the emission index, and can provide decisions that are fleet-wide or relating to multiple aircraft 20 having a common fuel or flight mission, for example. The controller 54 can make such measurements or decisions in real-time, such as during a flight mission while onboard the aircraft 20 (FIG. 1). In another example, the controller 54 can make such a determination after the completion of a flight mission, such as at a ground station 14 receiving flight data from the aircraft 20 after completion of the flight mission. The system 50 can be in the form of a program or software such as that provided on the controller 54 for storing and executing such a program or software. In non-limiting examples, the system 50 can be utilized by governments, airlines, fuel companies, and businesses, in order to closely monitor or manage emissions, as well as evaluate the economics or viabilities of adopting different fuels, flight missions, engines 22, or aircraft 20. Further, the system 50 can permit determination or projection of costs for using or purchasing a fuel against anticipated emissions for such use or purchase. The system 50 can be useful for businesses or organizations to be able to readily determine or predict the emission cost, carbon footprint, or monetary cost thereof, associated with individual fuels, engines 22, aircraft 20, fleets, or flight missions, while considering multiple simultaneous flights in real-time across a fleet of multiple aircraft 20.

The system 50 can include programming or instructions, such as within the controller 54, which can be configured to receive a control data input 60, configured to perform an input data quality check 62, configured to perform a performance correction 64, configured to perform a projection to different power levels 66, and configured to perform a data quality check 68. The system 50 can be configured determine and output an emission index 70 based on the control data input 60, the input data quality check 62, the performance correction 64, the projection to different power levels 66, and the data quality check 68.

The control data input 60 can be data, in non-limiting examples, that is related to: the aircraft 20, such as weight; the engine 22, such as power level, fuel usage, fuel type, engine age, cycle speed or level; or the flight mission, such as flight distance, flight time, flight speed, flight region, anticipated fuel usage, fuel type, or flight altitude. In one non-limiting example, at least some of the control data input 60 can be taken from the Aircraft Communications Addressing and Reporting System (ACARS), which can be provided to or from the aircraft 20 (FIG. 1) or the ground stations 14 (FIG. 1), such as revenues, service flight data, or other historical data for the engine 22 (FIG. 1) or aircraft 20. Service flight data can include data or information related to the engine 22 or the aircraft 20, such as fuel consumption rate, an emissions mass or volume, engine cycle speed, engine power levels, engine temperature, altitude, flight path, information related to flight mission, or other suitable historical data or information which can be determined from the engine 22 or aircraft 20. Information related to flight mission can include geographical or environmental information, such as local temperature, or dust, sand, or debris levels. Such information can be determined by the system 50 in real-time, such as on-board the aircraft 20, as well as being compared with predicted values to update models providing the control data input 60. In an additional non-limiting example, the control data input 60 can include continuous engine operational data (CEOD), which is continuously measured and recorded during flight, and can be measured and utilized in real-time. This historical data can be used, as the control data input 60 to the controller 54, to represent the deteriorated condition of the engine 22 resultant of prior use, such as age, time-on-wing, or other cycle information, as well as trends to determine anticipated changes or deterioration over time. This data can be utilized, by the controller 54, to determine emission types and amounts, including but not limited to nitrous oxide (NOx) or other nitrogen oxides or nitrous oxides, non-volatile particulate matter (nvPM), carbon monoxide (CO) or other carbon oxides, or unburned hydrocarbons (UHC) in non-limiting examples, which are released on a mass or volume basis relative to fuel usage. Additional control data input 60 can include, in non-limiting examples, flight mission, a flight altitude, a flight Mach number, an ambient temperature, local weather information, a fuel flow, a compressor discharge temperature, a fan rotational speed, a compressor bleed ratio, and/or a compressor discharge pressure. Additionally, the control data input 60 can include input recorded during flight, as well as pre-flight, post-flight, or in anticipation of a flight mission in non-limiting examples. For example, such control data input 60 can include real-time fuel usage, engine temperature, engine power level, engine cycle speed, or other data related to the flight mission as the flight occurs.

The controller 54 can be configured to perform the input data quality check 62, which can include reviewing the control data input 60 to ensure quality and accuracy. The control data input 60 can be compared against stored data, historical data, or other threshold information relating to the operation of the engine 22, the aircraft, 20, or the flight mission, such that the control data input 60 are within acceptable expected ranges or thresholds. For example, such stored or historical data can be data related to the aircraft 20, such as aircraft type, weight, age, engine number or position, or other information that can be utilized to determine emissions specific to the aircraft 20. Similarly, such stored or historical data can include data specific to the engine 22, such as deterioration level or engine age. For example, as the engine 22 deteriorates during usage, the fan rotational speed may slightly vary over time. If the fan rotation speed for the engine 22 is expected to be within 1% of 10,000 revolutions per minute (rpm), and the measured or actual fan rotation speed is not within 1%, a performance correction 64 can be made in order to update the system 50 to consider the actual fan rotation speed, and utilize that measured actual rotation speed in determining the emission index 70. At input data quality check 62, the controller 54 determines if any of the control data input 60 is outside of expected ranges or thresholds, and a user of the system 50 can perform manual corrections or request updated control data input 60 to be measured by the system 50, while it is contemplated that the system 50 can make such corrections and requests automatically, or at the discretion or permission of a user.

The controller 54 can be further configured to perform the performance correction 64 to correct any of the control data input 60 that is inconsistent with the requirements at the input data quality check 62. The performance correction 64 can utilize real-time measurements or information to determine actual-use values for the control data input 60 that are outside of the initial provided values. Where real-time measurements or information are not available, such as where the measurements or information are provided after completion of a flight mission, a performance correction can be made by comparing such measurements or information against expected values, where any discrepancy can be corrected by the controller 54 via the performance correction 64. This ensures that the control data input 60 is consistent with actual engine operational values, which ensures that engine deterioration is considered, and that the emission index 70 is respective of the engine 22 or aircraft 20 during completion of the flight mission.

The controller 54 can be further configured to project the control data input 60, and any that has been updated via a performance correction 64, to different power levels 66. The projection to different power levels 66 can be representative of different engine operational conditions or states, where such states utilize different power generation to maintain flight for completion of the flight mission. For example, a cruise power level is the engine operational condition to maintain cruise flight during the flight mission, and has an associated engine cycle speed, fuel burn, and temperature in non-limiting examples, and therefore, has an associated emission at that power level. During the flight mission, the engine 22 (FIG. 1) operates at different power levels, such as takeoff, climb, cruise, descend, or landing in non-limiting examples. Takeoff and landing can include immediate acceleration or deceleration for lift or landing, and can also include runway travel or waiting to take off or land, each of which utilize different engine power levels. Climb typically utilizes a maximum or near-maximum power level, which burns a relatively larger amount of fuel, and can contribute a relatively larger amount to the determination of the emission index 70, relative to other portions of the flight mission. Climb generates enough thrust to lift the aircraft 20 into flight, which utilizes a relatively higher fuel consumption rate than cruise or descend. Cruise can operate the engine 22 at a specific speed to generate a specific amount of thrust in order to maintain altitude and flight path. Cruise can further include ascension or descension to different altitudes or other flight path changes relative to real-time updates. For example, weather patterns or other environmental or industry factors can result in a change in flight plan or mission. Changing flight plan or mission can vary engine power level, emissions, and fuel usage. It is contemplated that the system 50 can consider a multitude of different engine power levels, across a multitude of potential variations to the flight mission, each of which may result in different levels of emissions. In this way, the system can consider different power levels for multiple aircraft 20 among a fleet of aircraft 20 can be considered in order to minimize or reduce emissions across the entire fleet. It should be understood that the emission index 70 for the aircraft 20 can vary in real-time, and that the system 50 can account for any such variation through iteration.

The system 50 utilizes the control data input 60 to project values to the different power levels utilized by the engine 22 (FIG. 1) for completion of the flight mission. Such projections enable the system 50 estimate the emissions at different engine power levels before the engine 22 operates at those levels, while the engine 22 changes between power levels, or after completion of a flight mission where the engine operation has varied among the different engine power levels. More specifically, the system 50 can utilize measurements made of the engine 22 or the control data input 60 to predict or estimate the emissions at different power levels prior to, during, or after a flight mission. Furthermore, as the engine 22 (FIG. 1) operates at the different power levels, real-time measurements can be made to provide updated control data input 60, or to perform additional input data quality checks 62 to ensure that the predicted performance correction 64 is accurate based upon in-flight data. For example, measurements for the engine 22 or the aircraft 20 can be made during preflight, takeoff, climb, or cruise, which can relate to the engine 22 or the aircraft 20 operation at various power levels, such as cruise, descend, or land, and the emissions related thereto. These determinations or emissions can be projected to the different power levels 66 in order to calculate emissions across various power levels for and during a flight mission, which can provide an accurate representation for engine operation and usage for an entire flight, regardless of variation among operating conditions.

The controller 54 can be configured to perform a data quality check 68 of the data projected to the different power levels 66. For example, if the projected data is inconsistent with expected projections the system 50 can update the tool 52, with the controller 54, by updating either the control data input 60 or the projection to different power levels 66. Such updates can account for any inconsistencies in the control data input 60 or the projections to different power levels 66, as well as to identify to potential issues with the aircraft 20 (FIG. 1), the engine 22 (FIG. 1), or the avionics system 24 (FIG. 1). If the data quality check 68 indicates that expected data is outside of predetermined ranges or thresholds, the controller 54 can indicate that review or maintenance may be beneficial. In one non-limiting example, the data quality check 68 can compare the projection at different power levels 66 to threshold values based upon the control data input 60 or against emissions margins for the projections to different power levels 66. Such thresholds can be based on the control data input 60. In another non-limiting example, the data quality check 68 can compare the projected power levels to measurements made during flight, and can update the projections to ensure that they are consistent with the engine 22 and flight mission.

The controller 54 can be configured to determine the emission index 70. The determined emission index 70 can be representative of the total emissions emitted by the engine 22, the aircraft 20, the flight mission, or combination thereof. In another example, the emission index 70 can represent emissions at a point in time, during a specific engine power level, or over a geographical area or period of time. In a non-limiting example, the determined emission index 70 can be output as an amount of emissions emitted over a period of time or for a flight mission, commonly represented in units of pounds per hour (lb/hr). Such an output can be representative of the total emissions for a flight mission, the aircraft 20, or the engine 22, or for a set of flight missions, a set or fleet of multiple aircraft 20, or set of multiple engines 22, and can be tailored to the aircrafts 20 and engines 22. The total emissions for the flight mission can be representative of the total mass or volume of emissions, considering variations in the engine 22 including deterioration or power level. The emission index 70 can be output by the controller 54, such as to a display or a database. For example, an output of the total emissions can be provided on the display 26 of the aircraft 20 (FIG. 1), such as within the cockpit of the aircraft 20 for which the emission index 70 was determined. Additionally, or alternatively, the determined emission index 70 can be determined or output at a point in time. For example, a flight mission has a departing location and an arriving location. The determined emission index 70 can be indicative of the emissions emitted during that flight, during a portion of that flight, such as over a geographical region or government, or at any point during that flight. Furthermore, the determined emission index 70 can be specific to the engine operational condition and power level, and for different portions of the flight mission, such as during takeoff, climb, cruise, descent, or land. The controller 54 can be configured to determine the emission index 70 for the flight mission by considering the power levels for completion of the flight mission, and the time associated with operating at each different power level. Utilizing this information, the system 50 can provide an accurate determination of the emissions emitted during a flight mission, a portion of the flight mission, or at any point during such the flight mission. Additionally, the controller 54 can request or make real-time measurements during the flight mission and can update the emission index 70 in real-time. Existing sensors within the engine 22 (FIG. 1) permit such real-time measurement, without a dedicated sensor specific to the emission index 70. Where the emissions index 70 is determined across a fleet of aircraft 20, the emission index 70 can be determined as a summation or representation of the individual emissions measured across the fleet of aircraft 20 to complete a set of flight missions, with each aircraft 20 of the fleet of aircraft 20 completing at least one flight mission of the set of flight missions.

Additionally, it should be appreciated that the system 50 can be iterative, repeating its processes and updating or redefining the control data input 60 to ensure accurate emissions measurement based on the emission index 70 from an earlier iteration. Such iterations can include making measurements of the engine 22 or aircraft 20 during the flight mission and updating the control data input 60 in real-time to ensure that an accurate representation of the engine deterioration is achieved through actual measurements of the engine 22 during use. Such iterations can be the result of the input data quality check 62 or the data quality check 68, for example. Such iterations provide for updated or new control data input 60, which the system 50 can utilize to determine if an update to the emission index 70 is beneficial.

Furthermore, the system 50 can determine the emission index 70 that is specific to the engine cycle model and can use the emission index 70 to generate revenue service snapshot data tailored to the engine cycle model. The system 50 can also use the emission index 70 across a fleet of aircraft 20. While the deterioration for the aircraft 20 or the engines 22 across a fleet of aircraft 20 will result in different emission indexes 70 that can be specific or tailored to each aircraft 20 or engine 22, those values can be considered across an entire fleet of aircraft 20 or for a set of flight missions, or where averages among a fleet of aircraft 20 can be utilized to output an emission index 70 representative of the whole fleet.

Figure 3:
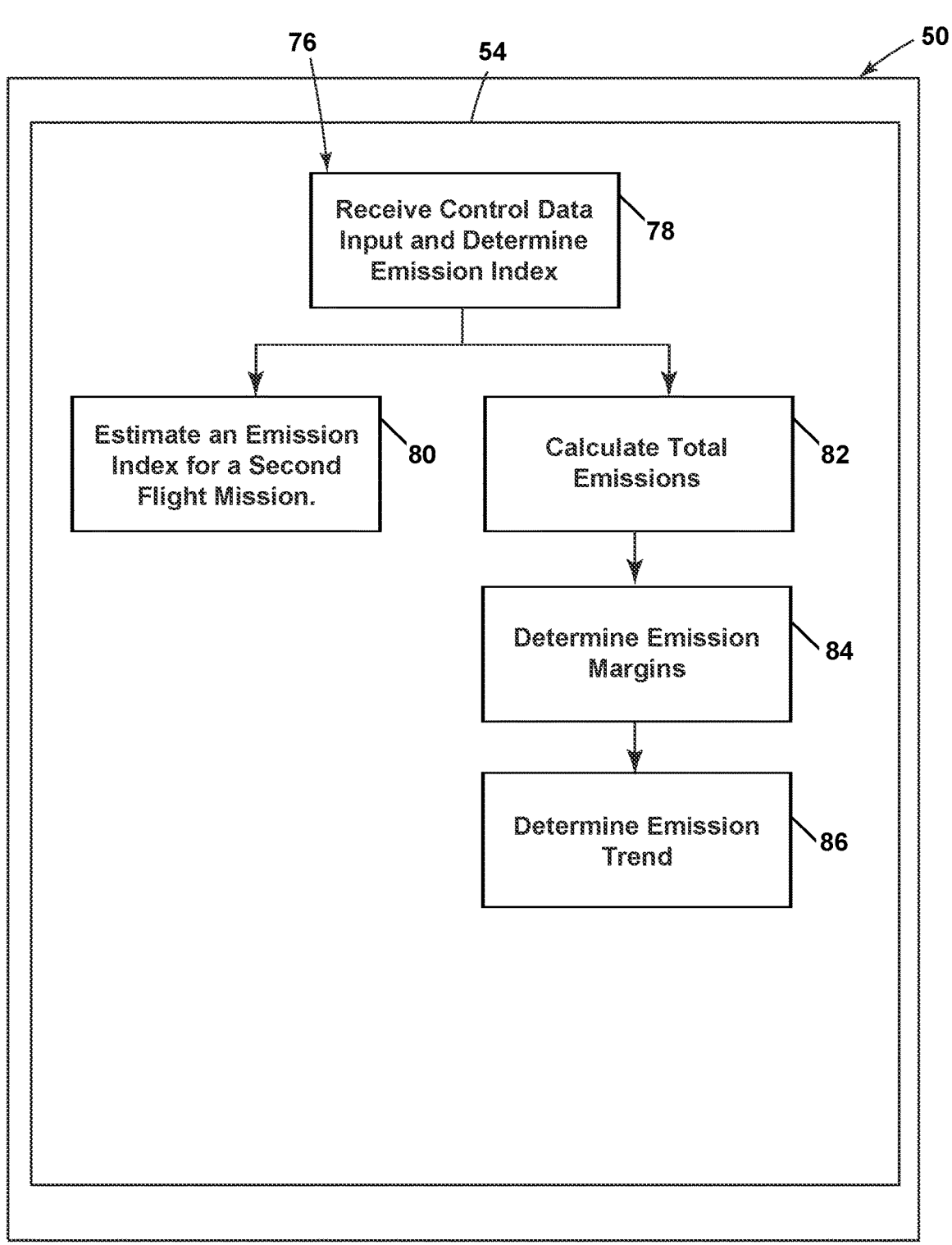
FIG. 3 is a schematic view of an on-ground implementation of the emission index of the system of FIG. 2, in accordance with aspects of the present disclosure.

Referring to FIG. 3, the system 50 determining the emission index 70 including the controller 54 can be utilized by an on-ground station at 76. On-ground stations at 76, such as the ground station 14 (FIG. 1), can include airports, air traffic control, or fueling stations in non-limiting examples, and is typically in remote communication with the aircraft 20 completing a flight mission. At 78, the on-ground station 76 can receive control data input 60 (FIG. 2) representative of a completed flight mission, a first flight mission, or a set of completed flight missions and determine the emission index 70 (FIG. 2). For example, the aircraft 20 can send, or the ground station 14 can request and receive, the control data input 60, as well as any other information from the completed flight mission required to determine the emission index 70.

At 80, the system 50 and controller 54 can predict or estimate an emission index 70 for a second flight mission, which can be a future second flight mission. More specifically, the control data input 60 received at 78 and used to determine the emission index 70 can be utilized to determine an emission index 70 for the second flight by inputting expected control data input 60 into the system 50 from the first flight mission that overlaps with the control data input 60 for the second flight mission in order to estimate the emission index 70 for the second flight mission. That is, the control data input 60, such as the flight path, distance, altitude, fuel type, engine 22, aircraft 20, that was used in the first flight mission can be input into the system 50 to output the emission index 70 for the second flight mission. Additionally, the system 50 can account for differences between the first flight mission and the second flight mission when determining the emission index 70 for the second flight mission. For example, where the engine 22, fuel, and aircraft 20 are similar, but the flight path is different, the system 50 vary the emission index 70 by flight path to make an accurate estimation. In a non-limiting example, where the flight path is longer or shorter for the second flight mission, or requires different power level usage, the system 50 can account for these differences, while still using control data input 60 values for the engine 22, fuel, and aircraft 20 to determine the emission index 70 for the second flight mission. In this way, the system 50 permits a ground station 14 to estimate and anticipate emissions for a later second flight mission utilizing the emission index 70 for the first flight mission. Such an estimation can permit the ground station to review if anticipated emissions for the second flight mission are within emission thresholds, to meet emissions goals for the second flight mission, the aircraft 20, the engine 22, or among a fleet of aircraft 20 or engines 22. In this way, the emission index 70 as historical data permits determination of expected total emissions for a later flight mission. Such a determination can be specific to the engine 22, the aircraft 20, the flight mission, or combinations thereof, or may be extrapolated among a fleet of aircraft 20 with a set of engines 22.

At 82, the on-ground stations at 80 can calculate the total emissions for the completed flight mission. The total emissions can be based on the emission index 70 or can be calculated based upon the control data input 60 used to determine the emission index 70. This information, for example, can be included in the control data input 60 (FIG. 2) and the projection to different power levels 66 (FIG. 2) can be made by the system 50 to determine the emission index 70. The total emissions can be derived from the control data input 60 or the emission index 70 and can be represented as a total mass or total volume for emissions for the completed flight mission. For example, the emission index 70 can represent a total emissions for a particular engine 22 or aircraft 20, which can be determined for a particular fuel or flight path used in completion of the completed flight mission. In this way, the system 50 provides an accurate representation of the total emissions for the flight mission, the aircraft 20 (FIG. 1) or fleet thereof, and engine(s) 22 (FIG. 1) by utilizing one or both of the control data input 60 and the emission index 70.

At 84, the system 50 can determine emissions margins, which can be margins derived from the emissions regulatory entities and values in one non-limiting example. Additionally, utilizing the emissions margins can at least partially define emissions thresholds. More specifically, if measured data fails to lie within anticipated emissions margins, the system can utilize this information to update the control data input 60 (FIG. 2), or even for redetermining the emission index 70 so data lies within expected emissions margins. Determination of the emission index 70 can slightly vary from actual emissions emitted during flight, such as +/−1% variation in one non-limiting example. Additionally, utilizing the margins can define thresholds. More specifically, if measured data falls outside of emissions margins, the system 50 can utilize this information to update the control data input 60 (FIG. 2) or the input data quality check 62 (FIG. 2), or even for redetermining the emission index 70 so that data falls within expected emissions margins. In this way, the system 50 can be iterative if total emissions are outside of expected ranges or thresholds.

At 86, the system 50 can determine, or the controller 54 can be configured to determine, an emissions trend. The emission trend determined at 86 can be a representation of emissions over time. For example, historical emission indexes 70 from previous flight missions can be stored within the controller 54 and utilized to determine a change in emissions or the emission index 70 over time. Such a trend can be identified for a particular repeated flight mission, a flight path, an aircraft 20, a fleet of aircraft 20, an engine 22, or multiple engines 22 across a fleet of multiple aircraft 20 in non-limiting examples. As the aircraft 20 and the engines 22 operate, high-cycle engine fatigue can reduce the efficiency of the engines 22 driving the aircraft 20. Additionally, such fatigue can impact emissions, varying the emissions emitted over time, or the levels of emissions at different power levels. More specifically, as the aircraft 20 (or engine 22) increases in operational lifetime and usage, the aircraft 20 and the engine 22 can experience deterioration, which can vary or increase overall emissions over time. Therefore, the system 50 can incorporate how emissions change over time with respect to the aircraft 20, the engine 22, or fleet thereof, represented as the emission index 70 and compared with historical emission indexes 70. The system 50 can utilize the emission index 70 and the determined total emissions at 82, to determine the emissions trend over time at 86, in order to ensure accurate measurement of emissions, even over time and with changes associated with the engine 22 or the aircraft 20 deterioration or fatigue. This emission trend determined at 86 can be utilized as control data input 60 (FIG. 2) to estimate emissions over time for the aircraft 20 or the engine 22.

Figure 4:
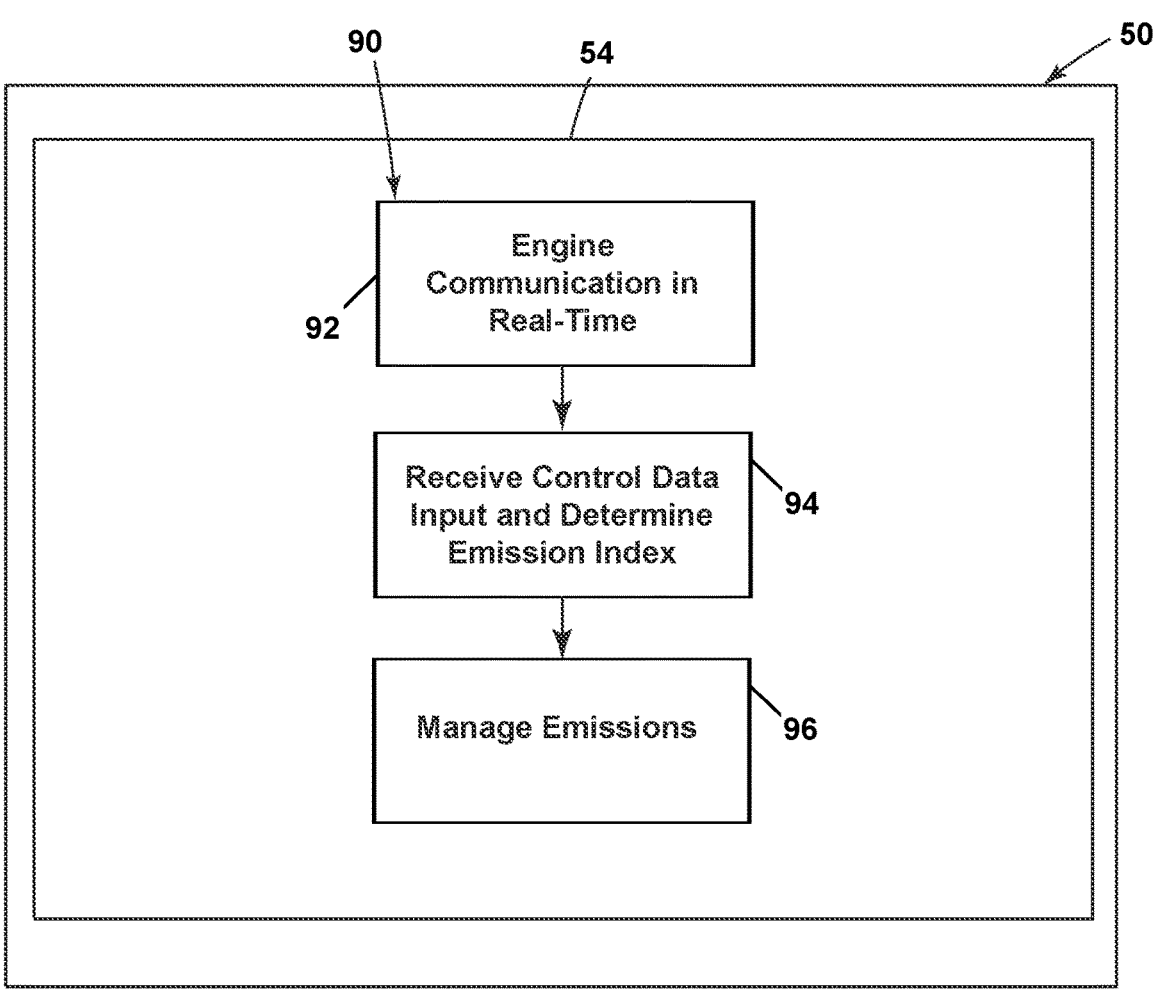
FIG. 4 is a schematic view of an onboard implementation of the emission index of the system of FIG. 2, in accordance with aspects of the present disclosure.

Referring to FIG. 4, the system 50 and the controller 54 can be integrated onboard of the aircraft 20 at 90, permitting real-time measurements, or receipt thereof, of the aircraft 20 and the engines 22 thereon. At 90, the engine 22 can be in communication with the aircraft 20 in real-time. This real-time communication permits the system 50 to iteratively request the control data input 60 utilized to determine the emission index 70 in real-time. For example, the controller 54 can request or receive control data input 60 (FIG. 2) from the engine 22, the aircraft 20, or the avionics system 24 during completion of the flight mission.

At 92, the system 50 can receive the control data input 60 requested from the aircraft 20, the engines 22, or the avionics system 24 and can determine an emission index 70. This process can be completed continuously during completion of the flight mission. In non-limiting examples, the system 50 can be configured to request or receive the control data input 60 at regular intervals, or at particular milestones during the flight, such as when a change of power level occurs, or change from take-off to cruise, or cruise to descend and landing.

At 94, the system 50 can estimate or project the emission index 70 for completion of the flight mission. The system 50 can utilize the control data input 60 over time to estimate or determine the emission index 70 for the completion of the flight mission while the flight mission is being completed. Furthermore, the system 50 can confirm that the emission index 70 remains accurate across different power levels as change of power levels occurs during completion of the flight mission occurs. While the system 50 can determine the emission index 70 for a flight mission, real-time measurement of emissions during flight can be periodically or continuously compared to the emission index 70 to ensure accurate data during execution of the flight mission. Such real-time measurement can occur by sensors provided in or in communication with the engine 22 (FIG. 1), such as temperature sensors, cycle speed sensors, or fuel burn sensors, in non-limiting examples. Additionally, or alternatively, the engine information can be taken from the aircraft 20, the engine 22, or the avionics system 24, in non-limiting examples, which can store operational data specific to the aircraft 20 or the engine 22. Such information can be utilized to determine the emission index 70 (FIG. 2) in real-time, which can be compared with initial measurements to ensure accuracy.

At 96, the emissions can be managed. If the emission index 70 represents a total emissions that are outside of expectations or the requirements to receive emissions credits or benefits, management of the emissions by the system 50 can be made. In a non-limiting example, the emissions can be managed by a person operating the aircraft 20, such as the pilot. In additional non-limiting examples, the emissions can be managed by the controller 54, such as by the FADEC on the aircraft 20, or can be automated such that certain emission index values can trigger management of the emissions. Management of the emissions can include, in non-limiting examples, changing or updating a flight plan, a flight speed, an altitude, a flight mission, a power level, or a fuel consumption rate. By changing one or more of these items, the emissions generated in real-time can also vary. In a non-limiting example, management of the emissions at 96 can include operating the turbine engine 22 in real time based on the emission index 70.

If the emissions determined by the system 50 in real-time at 92 differ from that as expected based upon the emission index 70 or historical values, then an indication can be output by the system 50, such as on the display 26 (FIG. 1). Such an output can be provided to or displayed to the pilot or aircraft operator on the display 26, or even someone remote from the aircraft 20, such as at the ground station 14 for example while still in real-time. The emissions can then be managed in real-time, and the system 50 can be iterative to provide an updated determination for the emission index 70 during the flight mission, as well as an updated total emissions 82. Such management of the emissions can be accomplished by varying one or more values defining the control data input 60 (FIG. 2). In a non-limiting example, the engine cycle speed can be varied in order to vary the emissions in real-time. In another non-limiting example, the flight mission can be varied or updated, such as changing flight path, flight speed, or altitude in non-limiting examples. Such variation is accounted for by the system 50 with an updated determination of the emission index 70 or an updated determination of the total emissions at 82, which can be performed iteratively or continuously during executing of the flight mission. Where the emissions are outside of expectations, action can be taken by the system 50 or a user thereof, to vary the flight mission to reduce or vary emissions to be within expectations. Such actions can include changing the flight mission, flight speed, flight path, or altitude, in non-limiting examples. Prior to flight, varying the flight mission can include varying the type of fuel to be used for completion of the flight mission.

Additionally, managing emissions in real-time can include balancing emissions against contrails. Engine exhaust is typically a mixture of emissions (often carbon dioxide) and water vapor. While emissions can have a negative environmental impact that is well recognized, contrails can reflect outgoing longwave radiation at a greater rate than incoming solar radiation, resulting in a net increase of radiation due to the contrails. Therefore, the emission index 70 can be used to reduce contrails, or balance a reduction of emissions against the generation of contrails. It is within the scope of this disclosure to consider weighing the non-water vapor emissions against the generation of contrails or water-type emissions to define or meet emissions goals, rather than merely considering emissions without regard to contrails.

Furthermore, the emission index 70 can be tied to or otherwise related to the engine 22. For example, the emission index 70 can be related to a serial number for the engine 22, or for the aircraft 20. Utilizing the serial number or other information related to the aircraft 20 or engine 22 can utilize the emission index 70 to indicate additional aircraft maintenance or inspection. Such an indication can be in the form of an alert or recommendation provided on a display, such as on the display 26 (FIG. 1) to the aircraft pilot, or a user at a ground station. The alert or recommendation can include additional information which can be derived from the emission index 70, such as the type of maintenance or the scope of the maintenance in non-limiting examples. The alert or recommendation may further permit a user to schedule maintenance, which can reduce costs. Timing or location of the maintenance can further be considered, such as which may be used to receive emissions credits for a particular government or region, and can utilize the emission index 70 to determine or mitigate maintenance costs. Furthermore, the emission index 70 could be utilized to forecast or otherwise predict emissions for a given timeframe or for different operational scenarios, which can be utilized determine trends, which can be utilized across a fleet of aircraft 20.

It is further contemplated that a maintenance alert can be generated based upon a measurement of the engine made by a sensor. Initiation of the measurement made by the sensor, or the maintenance alert itself, can be created based upon the emission index 70. For example, when the emission index 70 reaches a particular value or threshold, it is contemplated that a measurement can be initiated by the sensor or the system operating the sensor. The measurement can provide real-time values which can be used to determine if maintenance or inspection is recommended. Further still, it is contemplated that the emission index 70 can be used to validate or confirm engine deterioration estimates, which can be based on alternate measurements, such as measurements of the engine 22, or can be based upon information measured or generated on the ground or in flight prior to execution or during execution of the flight mission.

Referring to FIG. 5, a method 100 of determining emissions for an aircraft, such as the aircraft 20 (FIG. 1) or an engine thereon, such as the engine 22 (FIG. 1). Such a determination can be for a flight mission for the aircraft 20, or can be considered for a plurality of flight missions across a fleet of aircraft 20.

The method 100, at 102, can include receiving control data input, such as the control data input 60 of FIG. 2. The control data input 60 can be data, in non-limiting examples, that is related to the aircraft 20, such as weight, the engine 22, such as power level, fuel usage, fuel type, engine age, cycle speed or level, or the flight mission, such as flight distance, flight time, flight region, flight phase, anticipated fuel usage, fuel type, or flight altitude. Additional control data input can include, in non-limiting examples, flight mission, a flight altitude, a flight Mach number, an ambient temperature, local weather information, a fuel flow, a compressor discharge temperature, a fan rotational speed, a compressor bleed ratio, and/or a compressor discharge pressure. Additionally, the control data input 60 can include input recorded during flight, as well as pre-flight, post-flight, or in anticipation of a flight mission in non-limiting examples. For example, such control data input 60 can include real-time fuel usage, engine temperature, engine power level, engine cycle speed, or other data related to the flight mission as the flight occurs.

At 104, the method 100 can include performing a quality check for the control data input 60. The control data input 60 can be compared against stored data or historical data such that the control data input 60 are within acceptable expected ranges or thresholds. At 106, a user of the system 50 can perform manual corrections or request updated control data input 60 to be measured by the system 50, while it is contemplated that the system 50 can make such corrections automatically, or at the discretion or permission of a user. In a non-limiting example, such automated corrections can include automatically changing flight mission, flight speed, altitude, flight path, or engine cycle speed, in non-limiting examples, in order to appreciate a reduction in emissions.

At 108, the method 100 can include projecting the control data input 60 to different power levels. The system 50 can utilize either measurements made of the engine 22 or the control data input 60 to predict or estimate the emissions at different power levels.

At 110, the method 100 can include performing a quality check of the data projected to different power levels at 106. The projection of the data to different power levels can be within expected ranges or values. For example, where the projection to different power levels is outside of expected threshold values, the system 50 can be iterative, updating the control data input 102 and the projected power levels at 108 in order to ensure that values are within threshold ranges. If an iterative process remains outside of expected ranges or thresholds, it is contemplated that additional review or updating of the flight mission can be undertaken.

At 112, the method 100 can include determining an emission index, such as determining the emission index 70 of FIG. 2. The emission index 70 can be representative of emissions for the engine 22 or the aircraft 20 across various engine power levels for a flight mission. In this way, the emission index 70 can accurately determine emissions for a flight mission, where different engine power levels result in different levels or amounts of emissions, and while compensating for the engine's 22 or the aircraft's 20 level of deterioration.

The emission index 70 can be utilized in various manners including on-ground implementations and onboard implementations. For on-ground implementations, the method 100 can further include, at 114, determining total emissions for a flight mission based on the emission index 70 after completion of the flight mission. The total emissions can be representative of a total weight or volume of emissions for the completed flight mission. Additionally, the total emissions are representative of the actual emissions specific to the aircraft 20 or the engine 22 thereon, as well as the flight mission, considering measurements of the aircraft 20 or the engine 22 itself to generate control data input 60, such that the emission index 70 is also representative of the aircraft's 20 or the engine's 22 deterioration level.

At 116, the method 100 can include determining an emissions trend. Emission indexes 70 determined from prior flight missions can be saved or stored, such as data on the memory 58 of the controller 54 (FIG. 2). The total emissions or the emission index 70 for the completed flight mission can be compared with historical data across similar engines 22, aircraft 20, or flight missions to determine trends for emissions. Such trends can be utilized as control data input at 102 to more-accurately generate an emission index 70, as well as more accurately project the control data input to different power levels, as compared to a system without the benefit of historical data for the emission index 70 or the total emissions.

For on-board and real-time implementations, the method 100 can further include, at 120, determining emissions onboard of the aircraft 20 carrying the engine 22 while executing the flight mission. An on-board emission index 70 can be determined with real-time measurements of the engine 22 made during the flight mission, as well as confirming projections to different power levels as those power levels are reached during the flight mission. Such measurements can include engine cycle speed, engine temperature, and fuel burn rate in non-limiting examples. These real-time measurements can provide for an accurate determination of emissions via the emission index 70 by verifying the emission index 70 with the real-time measured data, or updating the emission index 70 such that the control data input and projected control data input to different power levels match the measurements being made. The system 50 and the controller 54 can use the real-time measurements to output the emission index 70 that considers the engine's 22 deterioration level, as well as anticipating any variation in emissions across engine power level. Such an output value or number that represents total emissions for the flight mission, such as a mass or volume of total emissions, which can be recorded or utilized. The output value can be generated by the system 50 and utilized to operate the aircraft 20 or the engine 22. Such utilization, in a non-limiting example, can include updating a flight mission, at 122. In a non-limiting example, where the emission index 70 or total emissions represents an amount of emissions that is too large for a particular flight mission to meet emission goals, the system 50 can change the flight mission (either for a single aircraft 20 (FIG. 1), or across a fleet of aircraft 20) in order to reduce total emissions or meet the emissions goals. Updating the flight mission can include, in non-limiting examples, changing or updating a flight plan, a flight speed, power level, altitude, destination, path, fuel type, fuel consumption rate, engine temperature, or engine cycle speed. Additionally, updating the flight mission can include managing emissions, such that the flight mission is changed or varied in order to meet a specific emissions goal, such as a total volume of emissions across a fleet of aircraft 20. It is further contemplated that the system 50 can update the flight mission automatically if the emission index 70 is representative of emissions or costs that are outside of expectations or predetermined thresholds, which can be tailored to the engine deterioration. In another non-limiting example, updating the flight mission can be accomplished at the discretion or permission of a user, such as the pilot of the aircraft 20 or at the ground station 14.

The sequence depicted is for illustrative purposes only and is not meant to limit the method 100 in any way, as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to those shown in the above figures are contemplated by the present disclosure. The aspects disclosed herein provide an emission index 70 that is specific to the deterioration level of the engine 22 or the aircraft 20 and compensates for variations in emissions across different engine power levels. The technical effect is that the emission index 70 provides a representation of emissions for the aircraft 20 or the engine 22 that is specific to that aircraft's 20 or engine's 22 level of deterioration, as well as any variation across power levels for the aircraft 20 or the engine 22. One advantage that can be realized in the above aspects is that the above-described aspects enable an accurate representation of emissions as an emission index 70 that is representative of deterioration of the engine 22 or the aircraft 20, as well as variation in emissions generated by different power levels for the engine 22. Traditional emissions measurements utilize a test engine, and just consider a mass or volume of fuel burn in determining emissions. Traditional emissions measurements fail to account for changes in emissions resultant of engine deterioration or variation in power level across a flight mission. The aspects described herein provide for an emission index 70 that does not fail to consider engine deterioration or variation across different power levels.

To the extent one or more structures, elements, or steps provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A method of determining emissions for an aircraft with a turbine engine for a flight mission, the method comprising: receiving a control data input including service flight data representative of a deterioration of the turbine engine; projecting the control data input to different power levels of the turbine engine for completion of the flight mission; generating an emission index based upon the control data input and the projected control data input for completion the flight mission; and operating the turbine engine based on the emission index to complete the flight mission.

The method of any preceding clause further comprising displaying the emission index for the flight mission on a display.

The method of any preceding clause further comprising performing an input data quality check for the control data input.

The method of any preceding clause wherein performing the input data quality check occurs prior to projecting the control data input to the different power levels.

The method of any preceding clause further comprising performing a performance correction when performing the input data quality check is outside of a threshold.

The method of any preceding clause further comprising performing a data quality check for the projected control data input at the different power levels.

The method of any preceding clause wherein the service flight data is received from an aircraft communications addressing and reporting system (ACARS).

The method of any preceding clause wherein generating the emission index further comprises generating the emission index at a ground station.

The method of any preceding clause further comprising providing the emission index to the aircraft.

The method of any preceding clause wherein the emission index is provided to a FADEC that operates the turbine engine based on the emission index.

The method of any preceding clause further comprising determining an emissions margin for the total emissions.

The method of any preceding clause further comprising determining an emissions trend.

The method of any preceding clause further comprising providing an alert based upon the emission index indicating recommended maintenance for the aircraft or the engine.

The method of any preceding clause further comprising managing emissions with the emissions index.

The method of any preceding clause wherein managing emissions further includes balancing the emission index against a generation of contrails during completion of the flight mission.

The method of any preceding clause wherein the emissions trend is specific to the aircraft or the turbine engine.

The method of any preceding clause wherein the emission index is determined onboard the aircraft during the flight mission.

The method of any preceding clause wherein the emission index is determined in real-time during the flight mission.

The method of any preceding clause further comprising managing emissions in real-time.

The method of any preceding clause wherein managing emissions in real-time includes updating the flight mission.

The method of any preceding clause wherein updating the flight mission includes changing a flight path.

The method of any preceding clause wherein the emission index is determined by an avionics system on the aircraft.

The method of any preceding clause wherein the avionics system is incorporated within a FADEC for the aircraft.

The method of any preceding clause wherein the emission index is representative of one or more of nitrous oxides, non-volatile particulate matter, carbon oxides, or unburned hydrocarbons.

The method of any preceding clause wherein the control data input further includes continuous engine operational data (CEOD).

The method of any preceding clause wherein the emission index is representative of a total mass of emissions for the flight mission.

The method of any preceding clause wherein the emission index is representative of a total mass of emissions per power level for the turbine engine for completion the flight mission.

A method of determining emissions for a fleet of aircraft across a set of flight missions wherein each aircraft among the fleet of aircraft completes at least one flight mission of the set of flight missions, the method comprising: receiving a control data input for each aircraft of the fleet of aircraft; projecting the control data input for each aircraft of the fleet of aircraft to different power levels for completion of the at least one flight mission; generating an emission index based upon the projected control data input for each aircraft of the fleet of aircraft to the different power levels for the fleet of aircraft for completion of the set of flight missions; and operating the fleet of aircraft based on the emissions index to complete the at least one flight mission of the set of flight missions.

The method of any preceding clause wherein the emission index is representative of a summation of individual emission indexes measured across the fleet of for completion of the set of flight missions.

The method of any preceding clause further comprising updating at least one flight mission of the set of flight missions.

The method of any preceding clause further comprising repeating the method utilizing the updated at least one flight mission of the set of flight missions to update at least a portion of the control data input.

The method of any preceding clause wherein updating the at least one flight mission includes one of, or a combination of, changing at least one of a flight path, changing the different power levels for completion of the at least one flight mission, changing a fuel type, or changing a flight speed.

The method of any preceding clause further comprising displaying the emission index for the set of flight missions on a display.

The method of any preceding clause further comprising performing an input data quality check for the control data input for each aircraft across the fleet of aircraft.

The method of any preceding clause wherein performing the input data quality check occurs prior to projecting the control data input to the different power levels.

The method of any preceding clause further comprising performing a performance correction when performing the input data quality check is outside of a threshold.

The method of any preceding clause further comprising performing a data quality check for the projected control data input at different power levels for each flight mission for the set of flight missions.

The method of any preceding clause further comprising determining emissions margins for the emission index.

The method of any preceding clause further comprising determining an emissions trend based on the emission index.

The method of any preceding clause further comprising managing emissions in real-time.

The method of any preceding clause wherein managing emissions in real-time includes updating at least one flight mission of the set of flight missions.

The method of any preceding clause wherein updating the flight mission includes changing one or a combination of a flight path, at least one power level of the different power levels, or a fuel type.

The method of any preceding clause wherein the emission index is representative of one or more of nitrous oxides, non-volatile particulate matter, carbon oxides, or unburned hydrocarbons.

The method of any preceding clause wherein the emission index is representative of a total mass of emissions for each flight mission of the set of flight missions.

The method of any preceding clause wherein the emission index is representative of the total mass of emissions at each power level for completion of each flight mission of the set of flight missions.

A system for determining emissions for a flight mission for an aircraft having a turbine engine, the system comprising: a controller configured to receive a control data input, wherein the controller is configured use the control data input to: project the control data input to different power levels for completion of the flight mission; generate an emission index based upon the control data input and the projected control data input; and output the emission index.

The system of any preceding clause further comprising a display communicatively coupled to the controller for displaying the emission index for the flight mission.

The system of any preceding clause wherein the controller is configured to perform an input data quality check for the control data input.

The system of any preceding clause wherein the controller is further configured to perform a performance correction if the input data quality check determines that the control data input is outside of a threshold.

The system of any preceding clause wherein the controller is further configured to perform a data quality check for the control data input projected to the different power levels.

The system of any preceding clause further comprising a ground station in communication with the controller wherein the emission index is used by the ground station to determine total emissions for the flight mission.

The system of any preceding clause wherein the controller is further configured to determine an emissions trend.

The system of any preceding clause wherein the emissions trend is specific to the aircraft or the turbine engine.

The system of any preceding clause wherein the controller is configured to determine the emission index in real-time during the flight mission.

The system of any preceding clause wherein the controller is integrated with an avionics system on the aircraft.

The system of any preceding clause wherein the avionics system is incorporated within a FADEC for the aircraft.

The system of any preceding clause wherein the emission index is representative of one or more of nitrous oxides, non-volatile particulate matter, carbon oxides, or unburned hydrocarbons.

The system of any preceding clause wherein the control data input further includes continuous engine operational data (CEOD).

The system of any preceding clause wherein the emission index is representative of a total mass of emissions for the flight mission.

The system of any preceding clause wherein the emission index is representative of a total mass of emissions per power level for the flight mission.

A system for determining emissions for a flight mission for an aircraft having a turbine engine, the system comprising: a controller configured to receive a control data input, wherein the controller is configured use the control data input to: project the control data input to different power levels for completion of the flight mission; generate an emission index based upon the control data input and the projected control data input; output the emission index; and operate the turbine engine based on the emission index.

The system of any preceding clause, wherein the controller is located onboard the aircraft.

The system of any preceding clause, wherein the controller is a FADEC.

The system of any preceding clause, further comprising a display communicatively coupled to the controller.

The system of any preceding clause, wherein the controller is further configured to output the emission index on the display.

The system of any preceding clause, wherein the controller is further configured to receive the control data input in real-time during the flight mission.

The system of any preceding clause, wherein the controller is further configured to operate the turbine engine in real-time based on the emission index.

The system of any preceding clause, wherein the controller is further configured to perform an input data quality check for the control data input.

The system of any preceding clause, wherein the controller is further configured to perform the input data quality check prior to projecting the control data input to the different power levels.

The system of any preceding clause, wherein the controller is further configured to perform a performance correction when the input data quality check is outside of a threshold.

The system of any preceding clause, wherein the controller is further configured to perform a data quality check for the projected control data input to the different power levels.

The system of any preceding clause, wherein the controller outputs an alert, based on the emission index, when the emission index is outside of a threshold.

The system of any preceding clause, wherein the alert is output on the aircraft in real-time.

The system of any preceding clause, wherein the controller is further configured to determine an emissions trend by storing and comparing historical emission indexes.

The system of any preceding clause, wherein the controller is further configured to compare the emission index against a generation of contrails by the turbine engine.

A system for determining emissions for a first flight mission for an aircraft having a turbine engine, the system comprising: a controller configured to receive a control data input for the first flight mission, wherein the controller is configured use the control data input to: project the control data input to different power levels utilized during completion of the first flight mission; generate an emission index based upon the control data input and the projected control data input; output the emission index; and operating the turbine engine for a second flight mission based upon the emission index.

The system of any preceding clause, wherein the controller is located on a ground station in communication with the aircraft.

The system of any preceding clause, wherein the controller is configured to receive the control data input after completion of the first flight mission.

The system of any preceding clause, wherein the controller is configured to store the emission index from the first flight mission to a memory.

The system of any preceding clause, wherein the controller is configured to determine an emissions trend based upon the stored emission index, and at least one stored historical emission index.

What is claimed is:

1. A system for determining emissions for a flight mission for an aircraft having a turbine engine, the system comprising:
    a controller configured to receive a control data input, wherein the controller is configured use the control data input to:
        project the control data input to different power levels for completion of the flight mission;
        generate an emission index based upon the control data input and the projected control data input;
        output the emission index; and
        adjust operation of the turbine engine for the flight mission based on the emission index, the different power levels, the flight mission, a flight phase, and a fuel flow.

2. The system of claim 1, wherein the controller is located onboard the aircraft.

3. The system of claim 2, wherein the controller is a full authority digital engine control (FADEC).

4. The system of claim 2, further comprising a display communicatively coupled to the controller.

5. The system of claim 4, wherein the controller is further configured to output the emission index on the display.

6. The system of claim 1, wherein the controller is further configured to receive the control data input in real-time during the flight mission.

7. The system of claim 6, wherein the controller is further configured to operate the turbine engine in real-time based on the emission index.

8. The system of claim 1, wherein the controller is further configured to perform an input data quality check for the control data input.

9. The system of claim 8, wherein the controller is further configured to perform the input data quality check prior to projecting the control data input to the different power levels.

10. The system of claim 9, wherein the controller is further configured to perform a performance correction when the input data quality check is outside of a threshold.

11. The system of claim 8, wherein the controller is further configured to perform a data quality check for the projected control data input to the different power levels.

12. The system of claim 1, wherein the controller outputs an alert, based on the emission index, when the emission index is outside of a threshold.

13. The system of claim 12, wherein the alert is output on the aircraft in real-time.

14. The system of claim 1, wherein the controller is further configured to determine an emissions trend by storing and comparing historical emission indexes and to adjust the control data input based on the emissions trend.

15. The system of claim 1, wherein the controller is further configured to compare the emission index against a generation of contrails by the turbine engine.

16. A system for determining emissions for a first flight mission for an aircraft having a turbine engine, the system comprising:
    a controller configured to receive a control data input for the first flight mission, wherein the controller is configured use the control data input to:
        project the control data input to different power levels utilized during completion of the first flight mission;
        generate an emission index based upon the control data input and the projected control data input;
        output the emission index; and
        configure operation of the turbine engine for a second flight mission based upon the emission index, the different power levels, a flight phase, a fuel flow, and at least one of the first flight mission or the second flight mission.

17. The system of claim 16, wherein the controller is located on a ground station in communication with the aircraft.

18. The system of claim 17, wherein the controller is configured to receive the control data input after completion of the first flight mission.

19. The system of claim 16, wherein the controller is configured to store the emission index from the first flight mission to a memory.

20. The system of claim 19, wherein the controller is configured to determine an emissions trend based upon the stored emission index, and at least one stored historical emission index.

\* \* \* \* \*